United States Patent

Dolle

[11] Patent Number: 5,104,598
[45] Date of Patent: Apr. 14, 1992

[54] PROCESS FOR PRODUCING LIGHT-WEIGHT FIBER BRICK

[75] Inventor: Hugo Dolle, Hettenleidelheim, Fed. Rep. of Germany

[73] Assignee: Didier-Werke AG, Wiesbaden, Fed. Rep. of Germany

[21] Appl. No.: 530,174

[22] Filed: May 29, 1990

[30] Foreign Application Priority Data

Dec. 22, 1989 [DE] Fed. Rep. of Germany ....... 3942528

[51] Int. Cl.⁵ ............................................. B28B 1/26
[52] U.S. Cl. ..................................... 264/87; 162/227; 162/228; 162/387; 425/85
[58] Field of Search .................... 264/86, 87; 162/227, 162/228, 387, 388, 390, 395, 391, 392, DIG. 1; 425/84, 85

[56] References Cited

U.S. PATENT DOCUMENTS

| | | | |
|---|---|---|---|
| 2,699,097 | 1/1955 | Binkley | 162/227 |
| 2,925,863 | 2/1960 | Chaplin | 162/391 |
| 3,147,180 | 9/1964 | Pellegrino et al. | 162/395 |
| 3,560,335 | 2/1971 | Lueders et al. | 162/228 |
| 3,661,707 | 5/1972 | Emery et al. | 162/228 |
| 4,203,936 | 5/1980 | Kiwak et al. | 264/87 |
| 4,204,907 | 5/1980 | Korklan et al.1 | 264/87 |
| 4,472,339 | 9/1984 | van der Ploeg et al. | 425/84 |
| 4,735,756 | 4/1988 | Rausch | 264/87 |
| 4,737,326 | 4/1988 | Wirth et al. | 264/87 |
| 4,840,763 | 6/1989 | Fritag | 264/87 |

FOREIGN PATENT DOCUMENTS

| | | |
|---|---|---|
| 2710996 | 9/1978 | Fed. Rep. of Germany . |
| 2924085 | 1/1981 | Fed. Rep. of Germany . |
| 3444397 | 6/1986 | Fed. Rep. of Germany . |
| 2132131 | 7/1984 | United Kingdom ............ 425/84 |

*Primary Examiner*—Mary Lynn Theisen
*Attorney, Agent, or Firm*—Wenderoth, Lind & Ponack

[57] ABSTRACT

A light-weight fiber brick is formed from a water-fiber suspension including ceramic fibers. A molding device is introduced into the suspension and has plurality walls including at least three walls each of which extends perpendicular to the other two of the three walls. Water is withdrawn simultaneously from the interior of the molding device through at least the three walls, thus causing the fibers of the suspension to tend to align longitudinally within the interior of the molding device in three spatial coordinate directions (X, Y, Z). Thereby there is formed a brick having fibers thereof aligned with longitudinal directions thereof having directional components in three spatial coordinate directions.

12 Claims, 7 Drawing Sheets

PROCESS FOR PRODUCING LIGHT-WEIGHT FIBER BRICK

BACKGROUND OF THE INVENTION

The present invention relates to a process and apparatus for producing a light-weight article, particularly a brick, made from a water-fiber suspension including ceramic fibers. The present invention also relates to a light-weight fiber brick produced by such process and apparatus. As employed herein the term "light-weight" brick is intended to refer, as is understood in the art, to a brick, block or other article of a construction, specifically a fiber construction, that is substantially of less weight than conventional brick construction.

The present invention particularly is directed to such a process and apparatus, and brick produced thereby, for manufacturing a fire-proof or refractory molded article from ceramic fiber material.

A process for producing such an article is disclosed in German DE 34 44 397 A1. In such process, the suspension is introduced into a molding device including a pressure resistant preform screen. Water is drawn off through suction applied to the side of such screen or mesh opposite the interior of the molding device. Thus, water is drawn off only through one side of the molding device. As a result, the fibers become oriented in substantially the same single direction throughout the interior of the molding device, and also then are oriented in substantially a single direction in the finished brick or article. In the case of relatively thin articles such as fiber boards, such a single fiber orientation is not critical. However, such a single fiber orientation is disadvantageous for block-shaped articles or bricks, since the fibers within such articles are arranged with substantially no cross linking. This impairs the stability of the fiber brick article and results in the thermal conductivity of the article being dependent upon and a function of the orientation of the article.

Disclosed in German DE 27 10 996 A1 and DE 29 24 085 are processes for manufacturing mineral fiber-containing paper products.

SUMMARY OF THE INVENTION

Accordingly, it is an object of the present invention to provide a process and apparatus for the production of a light-weight fiber block-shaped article, particularly a brick, from a water-fiber suspension, particularly including ceramic fibers, and to an article, particularly a brick, produced thereby, whereby it is possible to overcome the above and other prior art disadvantages.

The above object is achieved in accordance with the present invention by the provision that water of the suspension is withdrawn simultaneously through at least three sides of a molding device used to form the brick. As a result, the fibers tend to align longitudinally within the interior of the molding device in three spatial coordinate directions (X, Y, Z). Thereby, there is formed a brick having fibers thereof aligned with longitudinal directions thereof extending in or having directional components in three spatial coordinate directions. Thus, the fibers in the brick or other article are largely randomly oriented so that the result is a spatial cross linking of the fibers. Such spatial cross linking is advantageous for block-shaped light-weight fiber bricks, compared to relatively thin flat fiber boards, to achieve uniform properties in all directions of the brick.

In a preferred embodiment of the invention, water of the suspension is withdrawn from the interior of the molding device through five sides thereof, i.e. four side walls and a bottom wall. This improves the uniformity and equality of distribution of the fibers throughout the entire brick.

The process of the present invention can be carried out in a simple manner and, compared to prior art arrangements wherein water is withdrawn in only a single direction, no additional processing operations are necessary. The light-weight fiber brick of the invention is characterized in that the longitudinal directions of the fibers of the brick have directional components extending in three spatial coordinate directions.

The brick of the present invention with a substantially random orientation of fibers thereof and the spatial cross linking of the fibers has a higher strength than a light-weight fiber brick in which the fibers are oriented in parallel planes. Particularly, a parallel orientation of the fibers can lead to the brick being delaminated into plate-shaped layers subject to stress. The brick of the present invention also favorably has substantially the same thermal conductivity in all three spatial coordinate directions. The thermal conductivity of the brick thus is independent of the direction of orientation of the brick and the direction in which a heat gradient through the brick is effected. The brick of the invention has substantially uniform fiber density in all three spatial coordinate directions and substantially the same strength in all three spatial coordinate directions. The brick of the invention exhibits high thermal stability. These properties can be obtained with a low weight of the brick.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Illustrated in the drawings is an apparatus according to the present invention for carrying out a process of the present invention to result in a light-weight fiber brick according to the present invention.

Particularly, a water-fiber suspension, including ceramic fibers, is provided in a vessel 2. A supporting frame 1 has rotatably mounted thereon a member defining a vacuum suction passage 13, such member being rotatable about a substantially horizontal axis between the position shown in FIGS. 1-3 and the position shown in FIG. 4. This member supports three molding devices 3. It is intended however that fewer or greater than three molding devices may be provided. Supporting frame 1 also supports a plurality of molding stamps or compressing devices 4 actuated by cylinders 5, for example hydraulic cylinders. Each molding device 3 has a respective molding stamp 4 associated therewith.

Figure 3:
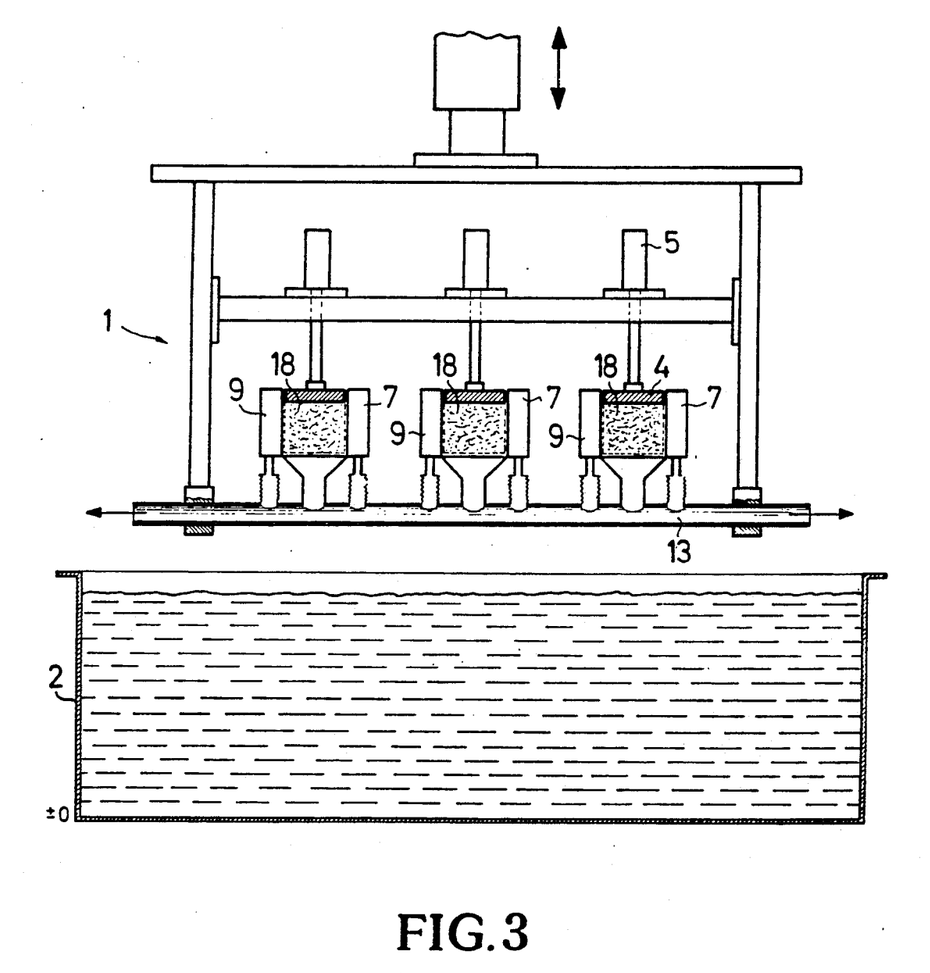
FIG. 3 is a similar view, but showing the molding devices withdrawn from the suspension to enable a compressing or stamping operation.
Figure 4:
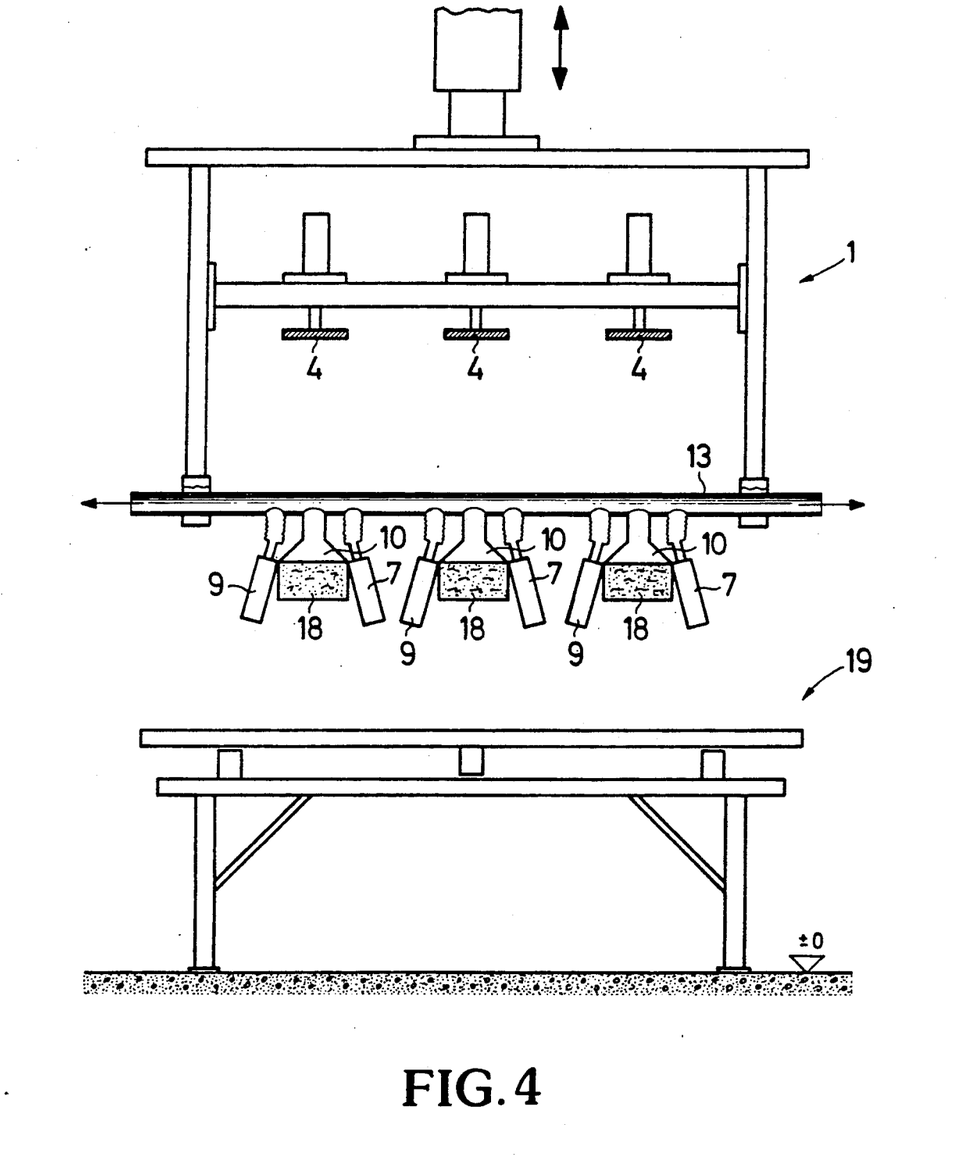
FIG. 4 is a similar view but showing removal of produced bricks.
Figure 5:
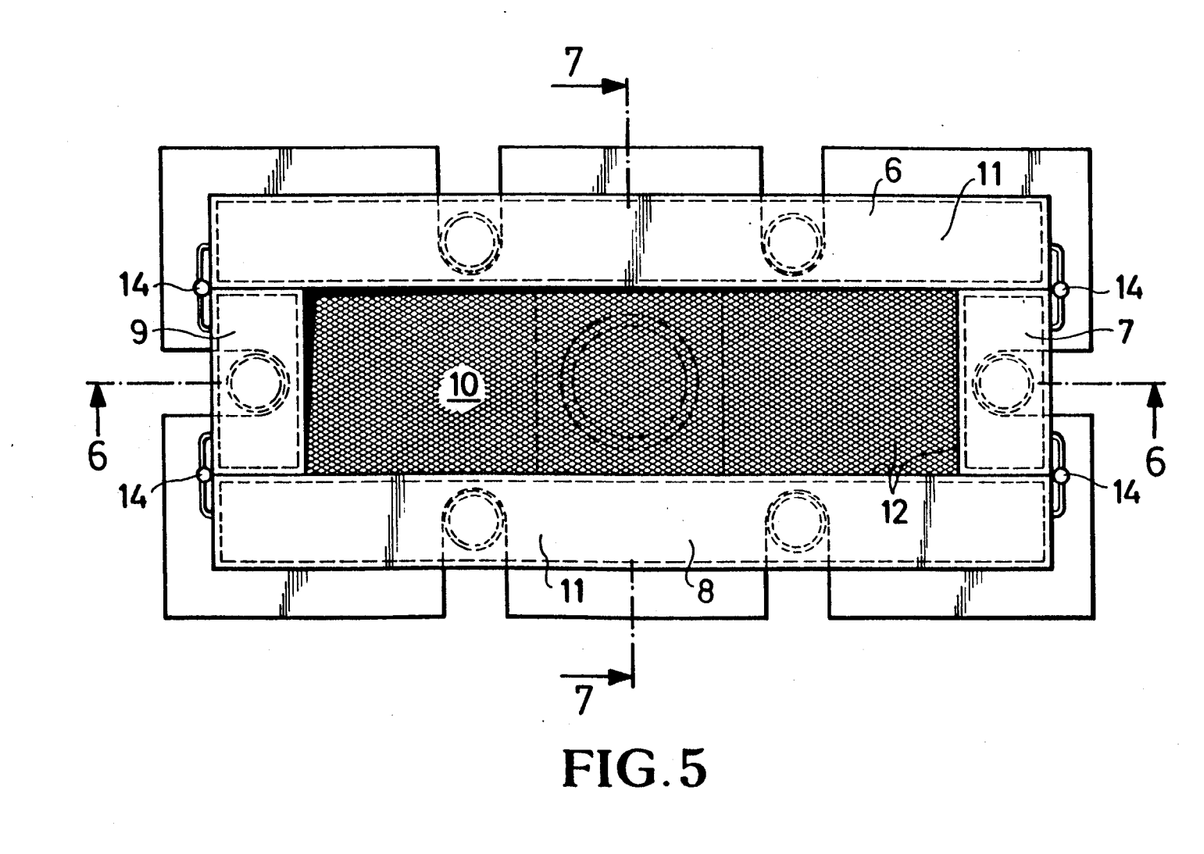
FIG. 5 is a top view of one molding device.
Figure 6:
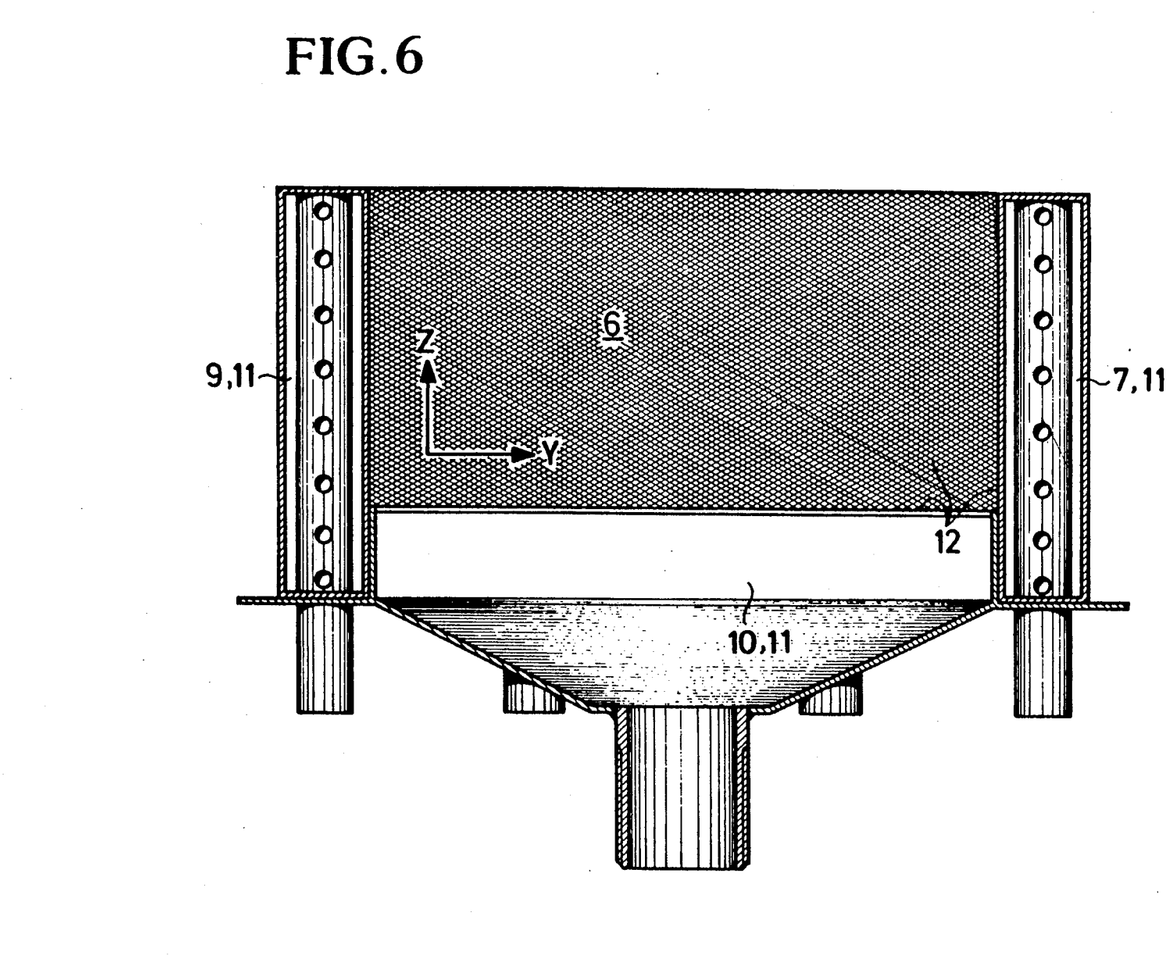
FIG. 6 is a sectional view taken along line 6—6 of FIG. 5.

Each molding device 3 includes four side walls or members 6, 7, 8, 9 and a bottom wall or member 10. Side walls 6-9 and bottom wall 10 define an interior of the molding device, such interior being open at the top in the position illustrated in FIG. 1. The side walls 6-9 and the bottom wall 10 each are formed of a structure including an internal chamber 11 that is separated from the interior of the molding device by a mesh, screen or lattice 12. Each of the internal chambers 11 is connected to vacuum suction line 13. The side walls 6-9 are pivotally or hingedly mounted with respect to bottom wall 10 so that they may be swung away from bottom wall 10, as shown in FIG. 4. Snap closures or similar devices 14 (FIG. 5) hold the side walls 6-9 together in the position shown in FIGS. 1-3 to define the interior of the molding device.

The apparatus of the present invention operates substantially in the following manner in accordance with the process of the present invention to produce bricks in accordance with the present invention.

Figure 1:
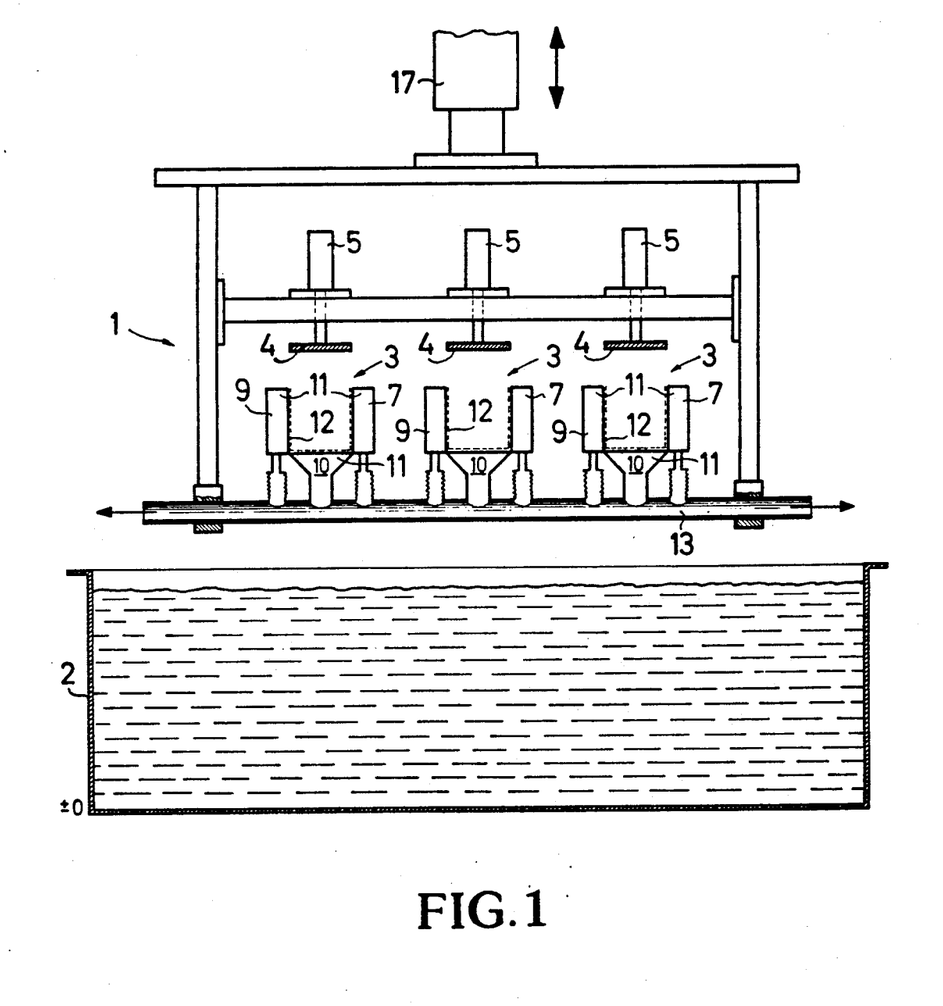
FIG. 1 is a sectional elevation view of an apparatus according to the invention and illustrating a plurality of molding devices located at an initial starting position.

Thus, in the position shown in FIG. 1, molding devices 3 are empty, molding stamps 4 are withdrawn away from molding devices 3, and vessel 2 is filled with a water-fiber suspension including ceramic fibers.

Figure 2:
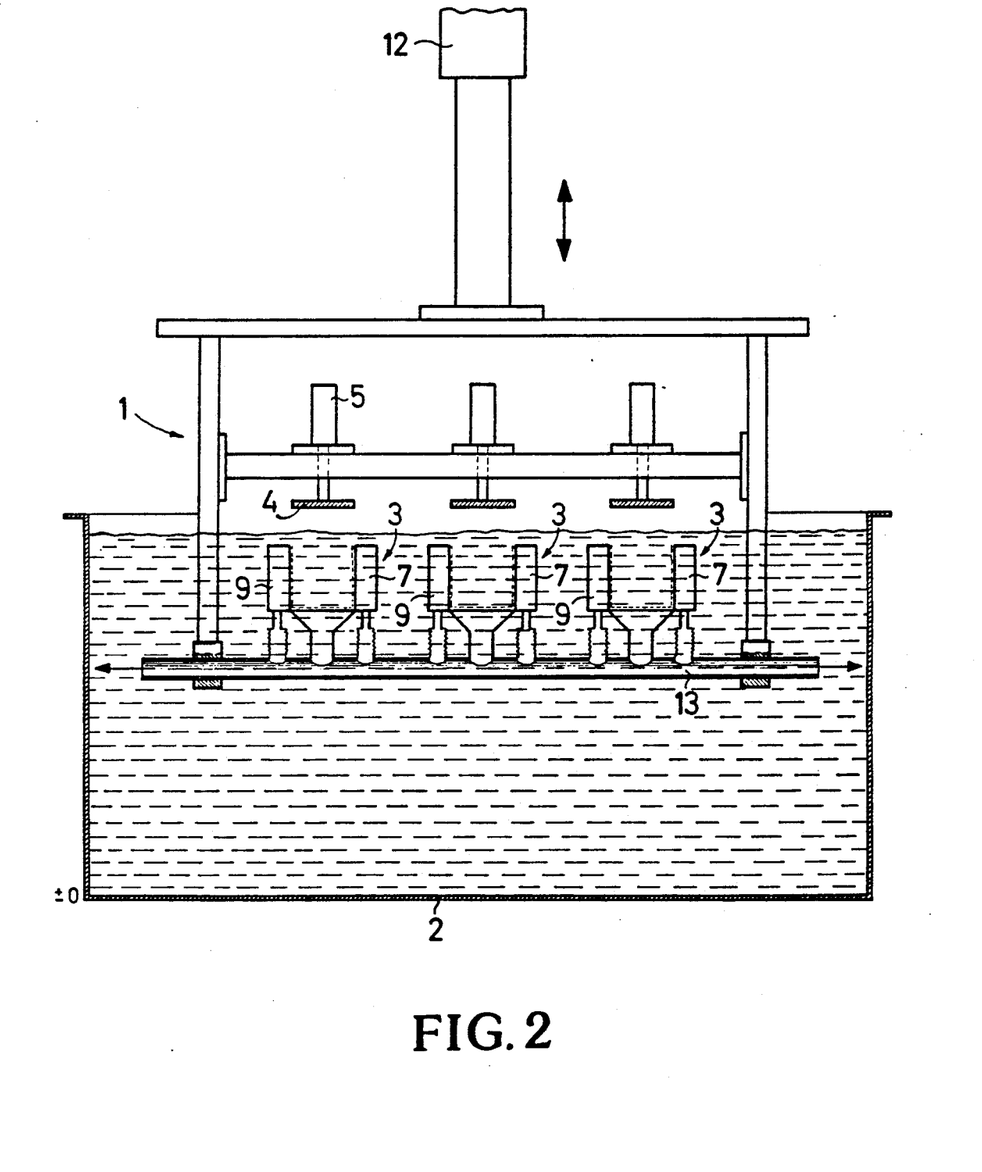
FIG. 2 is a similar view but showing the molding devices immersed in a suspension.

Subsequently, supporting frame 1 is lowered by means of a main cylinder 17 such that molding devices 3 are immersed in the suspension within vessel 2. As a result, the suspension flows into the interiors of the molding devices through the open tops thereof. Subsequently a reduced pressure is applied to vacuum suction line 13 and thereby to the internal chambers 11 of the side and bottom walls of each of the molding devices. This causes water from the suspension within the interiors of the molding devices to flow through the screens 12 of the side and bottom walls, while the fibers are retained by the screens 12. While this occurs, suspension continuously flows into the interiors of the molding devices from the open tops thereof. The result of this five-sided suction application to the interiors of the molding devices is that the longitudinal directions of the ceramic fibers are oriented in three spatial coordinate directions (X, Y, Z) in the interior of each molding device. In other words, in view of the fact that the water flows from the interior of each molding device in five different directions, the fibers will be aligned in such five directions, i.e. along three different spatial coordinate directions. As a result, the fibers will accumulate predominantly randomly within the interior of the molding device, and the result will be a spatial cross-linking of the fibers within the interior. This operation continues for a time sufficient to enable accumulation of the fibers, in the above described manner, within the interior of each of the molding devices sufficient to form the volume of brick intended.

Subsequently, the frame 1 is moved upwardly out of vessel 2 by main cylinder 17. Molding stamps 4 then are activated and extended into the respective molding devices so that the dewatered suspension or accumulated fibers are compressed. This tends to force out additional water from the suspension, and at the same time the reduced pressure is applied through vacuum suction line 13 and the internal chambers 11 to continue to withdraw water in five directions from the interior of each molding device. The result of this operation, shown in FIG. 3, is the formation of predried bricks 18.

Subsequently, the molding stamps 4 are withdrawn, and the member defining vacuum suction passage 13 is rotated relative to supporting frame 1 by 180° to the position shown in FIG. 4. In this position the open ends of the interiors of the molding devices are directed downwardly. Snap closures 14 or similar devices then are removed and side walls 6-9 are swung or pivoted away from bottom wall 10 of each molding device. With suction still applied to the internal chamber of bottom wall 10, the bricks 18 still may be retained on bottom wall 10. The bricks 18 may be deposited, for example, on a drying tray 19 by stopping the supply of vacuum or, if necessary, can be driven away from the screens 12 of bottom walls 10 by a blast of air.

The fiber bricks 18 then are dried, fired and cut to specified sizes, all as necessary.

Figures 7, 8:
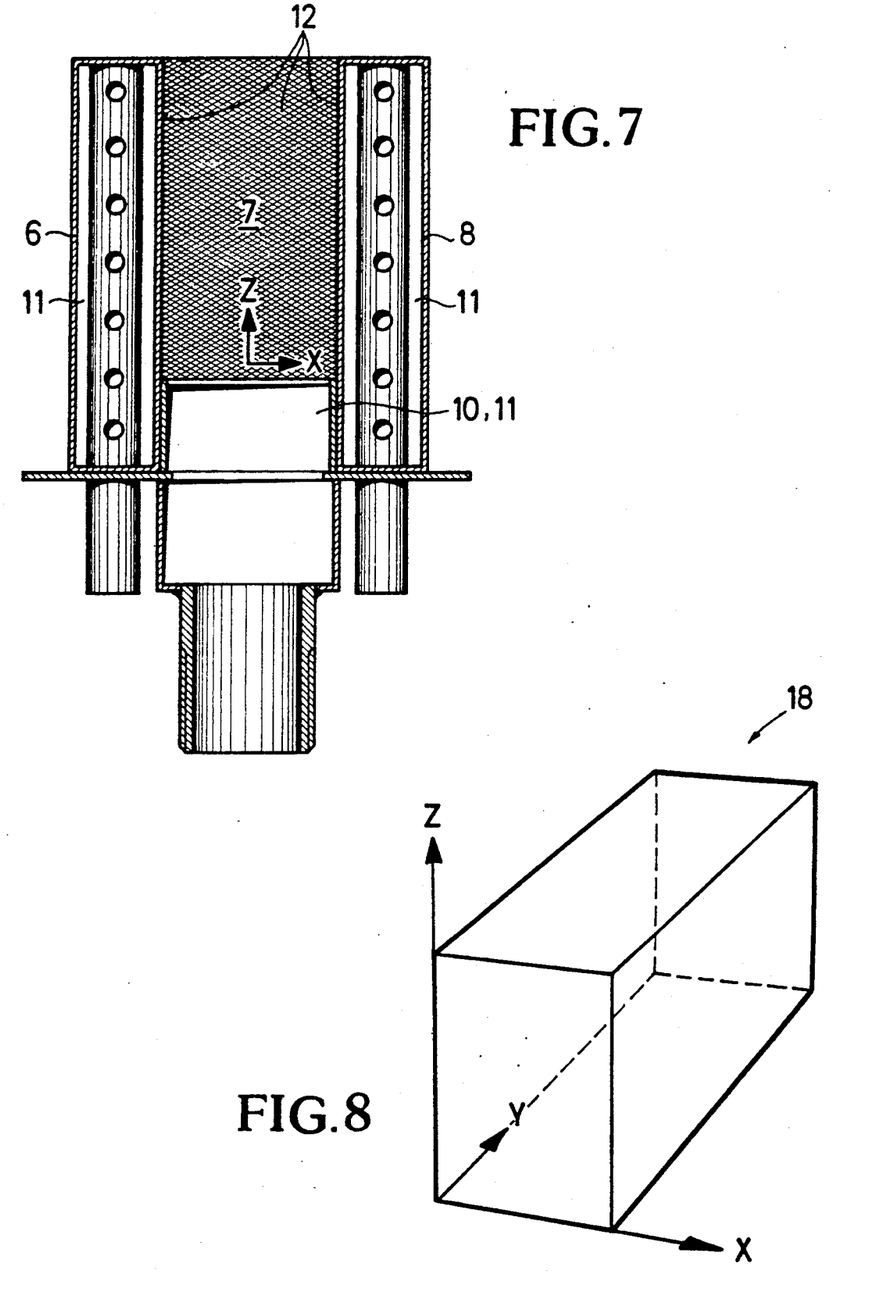
FIG. 7 is a sectional view taken along line 7—7 of FIG. 5.
FIG. 8 is a schematic perspective view of a brick according to the present invention and illustrates three spatial coordinate directions of fiber alignment.

A fiber brick 18 manufactured in the above manner includes ceramic fibers oriented in three spatial coordinate directions (X, Y, Z) as shown in FIG. 8. Since water was removed in five directions, the fibers within the brick will be substantially randomly arranged and will be spatially cross-linked. A largely homogeneous density will be achieved throughout the fiber brick.

It is understood that in accordance with the present invention, the suspension will be withdrawn from the interior of each molding device in at least three directions, thereby achieving fiber alignment in the three spatial coordinate directions.

In accordance with the present invention, it is possible to produce a fiber brick 18 with a raw density ranging from approximately 200 kg/m$^2$ to 800 kg/m$^2$, depending on the type and length of fiber employed. Raw density, strength and thermal conductivity of the fiber bricks also can be controlled by means of fillers such as fine-particle $Al_2O_3$, $ZrO_2$ and/or $SiO_2$. Also, it is possible to introduce binders such as conventional colloidal silica, for example the product LUDOX manufactured by Dupont, by means of a flocculation process with retention agents during formation of the molded body from the suspension and/or by subsequent impregnation of the dried brick body.

In accordance with the present invention, in view of the alignment of the fibers in a random manner with spatial cross-linking, it is possible to produce a brick with a uniform thermal conductivity in all three spatial coordinate directions, a substantially uniform fiber density in all three spatial coordinate directions, and substantially uniform strength in all three spatial coordinate directions. The prior art problems of planar delamination and directional orientation-dependent thermal conductivity thereby are avoided.

Although the present invention particularly is directed to a light-weight ceramic fiber brick, the present invention also is applicable to the formation of a fiber brick formed of other fibers. The particular suspensions employed to result in the production of a particular brick readily would be understood by one skilled in the art from the present disclosure.

Although the present invention has been described and illustrated with respect to preferred embodiments thereof, various modifications may be made to the specifically described and illustrated features without departing from the scope of the present invention.

I claim:

1. A process for the production of a light-weight fiber brick from a water-fiber suspension, said process comprising:
   providing a molding device including a bottom wall and four side walls extending perpendicularly from said bottom wall, thereby defining an upwardly open mold interior;
   introducing said suspension into said interior;
   simultaneously withdrawing water from said interior through said bottom wall and at least two mutually perpendicular and adjacent said side walls, and thus causing said fibers to tend to align longitudinally throughout said interior in three spatial coordinate directions, and thereby forming a brick having fibers thereof aligned with longitudinal directions thereof having directional components in three spatial coordinate directions;
   positioning a molding stamp in said interior and thereby compressing said aligned fibers of said brick therein, while simultaneously withdrawing further water through said bottom wall and said at least two side walls, thereby expelling further water from said interior; and
   moving said side walls relative to said bottom wall, and removing said brick from said molding device.

2. A process as claimed in claim 1, wherein said withdrawing comprises simultaneously withdrawing said water through said bottom wall and all said four side walls.

3. A process as claimed in claim 1, wherein said introducing comprises immersing said molding device in said suspension, and said withdrawing occurs while said molding device is thus immersed.

4. A process as claimed in claim 3, further comprising removing said molding device and aligned fibers from said suspension, and performing said positioning of said molding stamp in said interior of said molding device and thereby compressing said aligned fibers.

5. A process as claimed in claim 3, comprising simultaneously immersing a plurality of said molding devices in said suspension, and then conducting said withdrawing from all of said molding devices.

6. A process as claimed in claim 1, further comprising mounting said molding device on a member defining a vacuum passage, and rotatably mounting said member on a supporting frame that is vertically movable upwardly and downwardly.

7. A process as claimed in claim 6, wherein said introducing comprises moving said supporting frame downwardly and thereby immersing said molding device in said suspension.

8. A process as claimed in claim 7, wherein said withdrawing comprises applying a vacuum from said vacuum passage through said walls.

9. A process as claimed in claim 7, further comprising, after said withdrawing, moving said supporting frame upwardly to remove said molding device from said suspension.

10. A process as claimed in claim 9, comprising, after said moving upwardly, performing said positioning said molding stamp in said interior and said compressing.

11. A process as claimed in claim 10, further comprising, after said compressing, rotating said member relative to said supporting frame until said brick in said molding device faces downwardly.

12. A process as claimed in claim 11, wherein said moving comprises pivoting said side walls relative to said bottom wall away from said brick.

* * * * *